(12) United States Patent
Handerek

(10) Patent No.: US 9,375,693 B2
(45) Date of Patent: Jun. 28, 2016

(54) METHOD AND SYSTEM FOR PERFORMING CHEMICAL PROCESSES

(75) Inventor: Adam Handerek, Bielsko-Biala (PL)

(73) Assignees: Adam Handerek, Bielsko-Biala (PL); Hartwig Schleuter, Kaufungen (DE)

( * ) Notice: Subject to any disclaimer, the term of this patent is extended or adjusted under 35 U.S.C. 154(b) by 1196 days.

(21) Appl. No.: 13/319,374

(22) PCT Filed: May 11, 2010

(86) PCT No.: PCT/EP2010/002877
§ 371 (c)(1),
(2), (4) Date: Dec. 7, 2011

(87) PCT Pub. No.: WO2010/130404
PCT Pub. Date: Nov. 18, 2010

(65) Prior Publication Data
US 2012/0116142 A1 May 10, 2012

(30) Foreign Application Priority Data
May 14, 2009 (PL) .......................... 388028

(51) Int. Cl.
*C07C 4/22* (2006.01)
*B01J 4/00* (2006.01)
*B01J 19/00* (2006.01)
*B01J 19/24* (2006.01)
(Continued)

(52) U.S. Cl.
CPC *B01J 4/002* (2013.01); *B01J 4/007* (2013.01); *B01J 19/006* (2013.01); *B01J 19/24* (2013.01); *C10B 49/14* (2013.01); *C10B 53/07* (2013.01); *C10G 1/10* (2013.01); *B01J 2219/0004* (2013.01); *B01J 2219/0077* (2013.01); *B01J 2219/00135* (2013.01); *B01J 2219/00139* (2013.01); *B01J 2219/00166* (2013.01); *B01J 2219/00777* (2013.01); *C10G 2300/4056* (2013.01); *Y02P 20/143* (2015.11)

(58) Field of Classification Search
CPC ...................................................... C10G 1/02
USPC ...................................................... 585/240 S
See application file for complete search history.

(56) References Cited

U.S. PATENT DOCUMENTS

| | | | |
|---|---|---|---|
| 3,647,379 A | 3/1972 | Wenzel et al. | |
| 5,436,210 A | 7/1995 | Wilkinson et al. | |
| 5,693,188 A * | 12/1997 | Donnohue et al. | 202/118 |
| 7,955,508 B2 * | 6/2011 | Allan et al. | 210/749 |

FOREIGN PATENT DOCUMENTS

| | | |
|---|---|---|
| CN | 1692071 A | 11/2005 |
| DE | 28 34 173 | 2/1980 |

(Continued)

OTHER PUBLICATIONS

BUD Tire Facts Sheet. http://www.newmoa.org/solidwaste/BUDtirefactsheet.pdf Apr. 6, 2001.*

*Primary Examiner* — In Suk Bullock
*Assistant Examiner* — Sharon Pregler
(74) *Attorney, Agent, or Firm* — Whitham, Curtis & Cook, P.C.

(57) ABSTRACT

The invention relates to a method for performing chemical processes, where raw materials are heated, wherein a melt pool is produced in a tank or reactor using low-melting metals or metal alloys, wherein the raw materials are metered directly into the melt pool in the lower part of the tank or reactor.

3 Claims, 2 Drawing Sheets

(51) Int. Cl.
*C10B 49/14* (2006.01)
*C10B 53/07* (2006.01)
*C10G 1/10* (2006.01)

(56) References Cited

FOREIGN PATENT DOCUMENTS

| | | |
|---|---|---|
| EP | 1 840 191 | 10/2007 |
| JP | 493803 B1 | 1/1974 |
| JP | 07506145 A | 7/1995 |
| JP | 09-152278 | 6/1997 |
| JP | 10502109 A | 2/1998 |
| PL | 372777 | 9/2006 |
| RU | 2118192 C1 | 8/1998 |
| WO | 93/25277 | 12/1993 |
| WO | 94/04633 | 3/1994 |
| WO | 96/00268 A1 | 1/1996 |
| WO | 2004/000723 A1 | 12/2003 |
| WO | WO 2009/006711 | 1/2009 |

\* cited by examiner

METHOD AND SYSTEM FOR PERFORMING CHEMICAL PROCESSES

The invention relates to a method for performing chemical processes in which raw materials are heated, wherein a melt pool is produced in a tank or reactor using heated-up, low-melting metals or metal alloys. The invention also relates to a system for performing chemical processes, comprising a tank or reactor for accommodating a melt pool of a low-melting metal or a low-melting metal alloy.

In the Polish patent application P-372777, a reactor for performing thermal depolymerization processes on plastics waste products has been presented. This reactor is equipped with a turbomixer and a set of tube preheaters, which are alternately housed in a long, narrow and flat box and are located under the surface of the molten material. The heaters are preferably charged with low-melting metal, for example with Wood's alloy. Provided between the mixers and the preheater are vertical barrier walls, which ensure the longitudinal flow through the preheater.

In the case of the process described, overheating of the molten materials may occur, causing carbonization deposits that are difficult to remove to occur on parts of the system. In addition, an intensive mixing operation is required during the chemical process.

The invention is based on the object of making it possible for the chemical processes mentioned to be performed more easily and without the risk of overheating and deposits.

This object is achieved according to the invention with a method of the type mentioned at the beginning by the raw materials being metered directly into the pool in the lower part of the tank or reactor.

The low-melting metals or metal alloys are heated by means of at least one, preferably electrical, heating device, either directly in the tank or reactor or in a separate vessel, so that the molten alloy is fed to the tank or reactor.

The fed raw materials may be introduced in a metered manner into the melt pool as solid materials or as a fluid, in particular as a liquid. Since the raw materials preferably have a lower density than the melt pool, they automatically move upward through the melt pool, the desired chemical process proceeding. The automatic rising up of the raw material after the metered feeding can be slowed down by barrier walls, spiral conduits or gratings in the melt pool.

In the molten state, the melt pool in the tank or reactor expediently has a temperature of between 50° C. and 1000° C., with preference between 50° C. and 550° C.

The aforementioned object is also achieved by a system of the type mentioned at the beginning which is characterized in that the tank or reactor is provided in its lower part with a feeding device for the metered feeding of raw materials directly into the melt pool.

The raw materials may be introduced into the melt pool in any state of aggregation, in particular in a liquid or solid form.

For fluids, in particular for liquid raw materials, the feeding device may have a nozzle device, with which the fluidic raw material can be introduced into the melt pool in a metered manner under positive pressure. For solid materials, the metering is performed, for example, with a metering feed screw.

The tank or reactor may be equipped with a heating element in the lower part, preferably with an electrical heating device and with particular preference with an induction heater. The induction heater may in this case extend cylindrically around the shell of the reactor or tank. The induction preferably takes place with a low frequency, in order to avoid skin effects. This arrangement has the advantage that the entire melt pool is heated uniformly over the entire volume, so that the heating up does not only take place from below. Alternatively, the tank or reactor may be fed the low-melting metal heated in a separate vessel or the heated low-melting metal alloy.

Furthermore, the tank or the reactor may be provided with barrier walls, spiral conduits or screens for slowing down the rising up of the raw materials.

The process according to the invention makes it possible for raw materials, substrates and reactants that are used in the process to be heated very effectively and efficiently. The separated contaminants and deposits, such as carbonizate, can be easily removed. These settle on the surface of the molten metal or the metal alloy or can be flushed out with solvent or water. The cleaning of the molten metal may be performed at elevated temperatures in the liquid state, by allowing water to pass through the alloy let out from the tank or the reactor.

When liquid raw materials are used, the feeding is preferably brought about by nozzles with openings for metering the liquid raw material, whereby the drops of the raw material rising up to the surface automatically ensure intensive mixing of the substances during the heating operation. A mixing device is rendered superfluous in many cases. Nevertheless, it may be advisable optionally to equip the vessel or reactor with a mixing device.

The diameter of the nozzle openings for the feeding of a fluidic, in particular liquid, raw material is chosen according to the raw material and depends on the physical-chemical properties thereof. The dimensions of the openings typically lie between 8 μm and 2 mm.

An example of a process which can be performed by the method according to the invention is the cleaning or fractionating of separated substances, such as for example used oil, by distillation. The thermocatalytic depolymerization of plastics waste products, for example polyolefin plastics, may be cited as another example. These methods have previously used heating elements which come into contact with the heated liquids directly or via the wall of the heated reactor. This has the consequence that contaminants in the form of carbonizate settle on the overheated elements of the system. Even any kind of improvement of the mixing operation during the working process does not make it possible to prevent carbonizate from settling on the heated surfaces. Consequently, temporary breaks in work, in which the system had to be cleaned, were required.

According to the invention, the method may comprise any desired phase of the chemical process, such as for example the precleaning of substances, the comminution thereof, the plastication thereof in melting furnaces, the transformation of solid raw materials into the liquid state, the elimination of all kinds of fractions that represent a main product or byproduct, the return of solvents and other substances involved in the chemical process and the phases of adding catalysts and discharging the used fractions thereof. In the same way, according to the invention, the system comprises type-specific sections for performing the aforementioned phases. These phases are type-specific and generally known. The invention is concerned with improving the heating of the heating phase within the known methods and improving the conventional systems by introducing a novel heating method. The temperatures which can be used in the case of the method according to the invention lie in the range from 50° C. to 1000° C. or from 50° C. to 550° C.

According to the invention, a liquid (molten) state of the heated-up metal or the heated-up metal alloy is used. In a cylindrical vessel, for example with a conical bottom, a heating element, generally an electrical heating element, which heats the low-melting alloy, may be located in the lower part. Alternatively, a heater extending cylindrically over the height of the wall, in particular an electrical heater and preferably an induction heater, may be used, said heater being arranged cylindrically around the shell of the tank or reactor and offering the advantage that the entire volume of the metal or the metal alloy can be heated uniformly or with a defined temperature gradient.

In the lower part of the vessel there is a feeding device, through which the raw material is introduced into the vessel. The raw material may in this case be metered into the melt pool under pressure in the liquid state. The positive pressure serves the purpose of overcoming the pressure of the melt pool in the tank or the reactor. The dimensions of the openings in nozzles that are used for this are adapted to the substances involved in the chemical reaction.

The nozzles ensure the injection of the liquid raw material, which quickly goes over into a "droplet form", whereby effective heating is ensured on the way to the surface of the liquid low-melting metal alloy. The density of the liquid raw material is much lower than the density of the alloy. It may therefore be expedient to use barriers in the tank, in order to slow down the heating time for the raw material, that is to say slow down the passing of the substances through the alloy. The duration of the chemical process at the elevated temperature is not determined solely by the corresponding choice of temperature, but also by the height of the column of the molten metal, the type of barriers that are used, the dimensions of the nozzle openings and the amount of substance added in a specific unit of time.

The invention also advantageously makes the feeding of solid materials possible. For example, it is possible according to the invention to clean sand that is contaminated with oil. The sand in this case catalytically assists the depolymerization of the oil, so that a melt bath temperature of, for example, 450° C. is sufficient to depolymerize the oil and possibly convert it into useful fractions and the substances that can be used. The grains of sand collect in a dry form on the surface of the melt pool and can be removed from there in a simple way, for example by blowing off with a stream of oxygen-free gas.

A further example of an application for a chemical process according to the invention with solid raw materials is the separation of plastic and aluminum, which can be materials that are firmly bonded to one another. These materials in a ground form are introduced into the melt pool in a metered manner via a transfer gate, for example with a slide. The plastic may thereby be depolymerized and discharged in a gaseous form, while the aluminum collects in a solid form on the surface of the melt pool and can be removed, for example by suction.

Also when feeding parts of plastic, the method according to the invention may also be operated in a temperature range in which the plastic is not yet depolymerized. In this case, the plastic can be removed in liquid form on the surface of the melt pool.

If the mixing of the raw materials with the melt pool does not take place in a sufficient form of its own accord, a mixing device may be provided. It is preferred, however, in this case to induce a mixing effect by small gas bubbles forced in by means of nozzles. The small gas bubbles are in this case preferably formed by process gases which cannot condense, and consequently cannot be made to circulate, at the process temperatures occurring in the system. If it appears to be advisable to drive out hydrocarbons from the system, a purging can be performed in this way, for example with $CO_2$.

The method according to the invention is also suitable for very effective drying of solid materials, for example sludge. In this case, the dried sand on the surface of the melt pool can be removed in a simple form.

In particular when a heater formed cylindrically in or on the wall is used, for example an induction heater, it may be advisable to establish a temperature gradient in the melt pool in the tank or reactor, in order for example to be able to have a controlled influence on parts of plastic.

Furthermore, it is possible to carry out more complicated reactions by arranging a number of tanks or reactors with different temperatures of the melt pools one behind the other. In this way, for example, mixtures of water, glycol and methanol can be separated from one another. In a first reactor, the melt pool may have a temperature of 72° C., for example, whereby methanol evaporates and the mixture of glycol and water can be removed from the surface of the melt pool. In the second reactor, a melt pool temperature of 86° C. can then be set, whereby the glycol evaporates and can be drawn from the surface of the melt pool of pure water.

Apart from controlling the temperature, controlling the dwell time of the raw materials in the melt pool is of significance. In many cases, the use of screens of different mesh widths is advantageous for allowing the dwell time to be controlled. The screens may in this case regularly have mesh widths of between 0.1 mm and 2 mm. This is advantageous in particular for the treatment of particles of solid material introduced into the melt pool that melt slowly in the melt pool. The use of screens with decreasing mesh widths can ensure that the particles of solid material can only respectively migrate a stage upward when they have been reduced in size by melting operations to the extent that they pass through the mesh width of the respective screen. The particles therefore remain clinging to the respective screens until further melting allows them to pass through the meshes of the screen, in order then to reach the next screen with a smaller mesh width or—in the molten form—to reach the surface of the melt pool.

In the case of the method according to the invention, various low-melting metals and alloys can be used, for example alloys with gallium and indium (melting temperature 47° C.), Wood's alloy (melting temperature 70° C.), Lipowitz's alloy (melting temperature 80° C.), Newton's alloy (melting temperature 96° C.), Lichtenberg's alloy (melting temperature 92° C.)

The invention will be explained in more detail below on the basis of exemplary embodiments that are represented in the drawing, in which.

Figure 1:
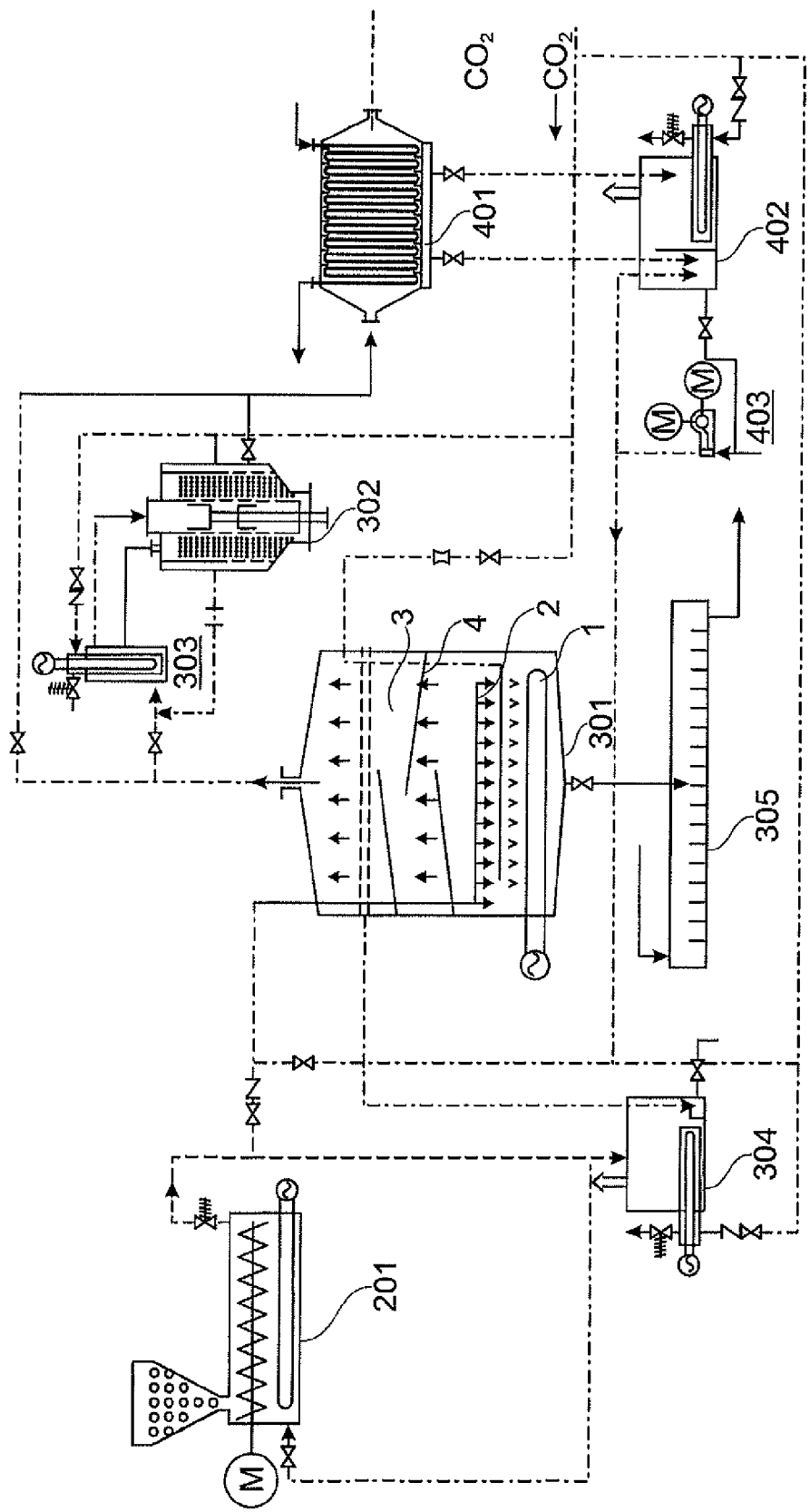
FIG. 1 shows a model system of the invention for a liquid raw material.

The system represented in FIG. 1 is a system for the thermo-catalytic depolymerization of plastics waste products, such as for example polyolefin plastics. It is equipped with a melting device 201, a wet reactor 301, located in which are the nozzles 2 with the openings via which the molten raw materials, i.e. waste products of polyethylene and polypropylene PE and PP, are delivered.

The reactor is filled with low-melting metal alloy 3, which is heated by an electrical heating element 1. In the reactor there are barriers 4, which slow down the flow of the droplets of plastic through to the reactor surface. Furthermore, the system is equipped with a dry reactor 302, a heater 303 for the hydrocarbon vapors, a drain tank 304, a drain tank for the alloy 305, a condenser 401, a condensate tank 402, a condensate metering pump 403 and a $CO_2$ tank. The component parts of the system that are mentioned are known and are used in systems of this type. The main modification is a new design of the wet reactor 301, in which the raw materials (substances used during the process), i.e. polyolefin waste materials, are heated.

In the drain tank 305, the cleaning of the alloy may take place by means of a liquid flushing or setting of the temperature to about 100° C.

EXAMPLE

In the system for the thermo-catalytic depolymerization of plastics waste products, which contain residues of polyethylene and polypropylene, a reaction in which the liquid low-melting alloy took the form of the Wood's alloy was performed. The initially molten waste materials were passed on via the nozzles accommodated in the lower part of the reactor with openings of 0.5 to 1 mm in diameter. The pool of Wood's alloy located in the reactor was kept at a temperature of between 400 and 420° C.

Figure 2:
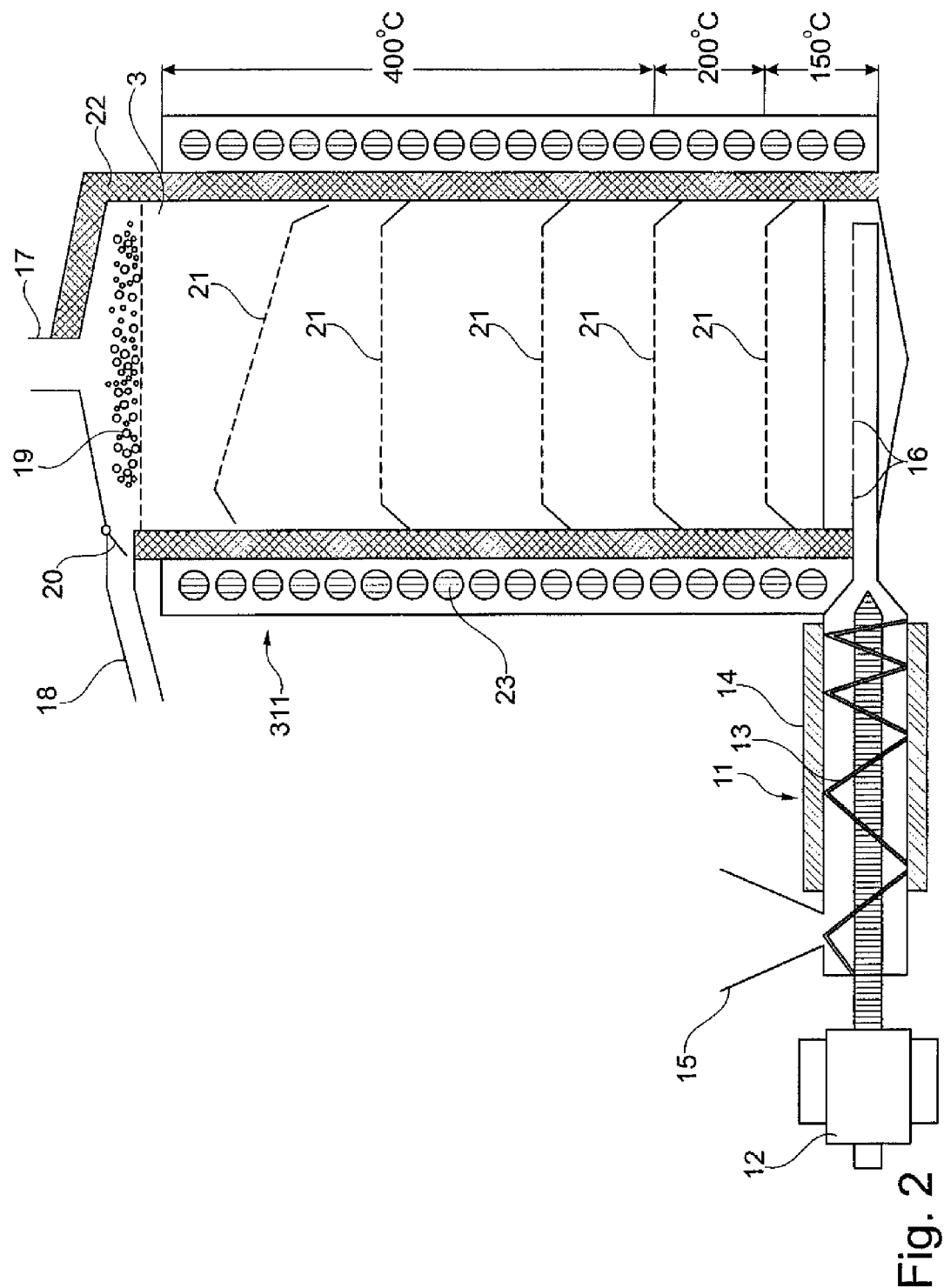
FIG. 2 shows a variation of the system according to FIG. 1 for the use of solid raw materials.

FIG. 2 shows a variant of a wet reactor 311, which can be used in the system according to FIG. 1 instead of the wet reactor 301, in order to treat solid materials as raw materials. Accordingly, a horizontally lying metering feed screw 11 is arranged against the bottom of the reactor 311. An electric motor 12 drives a screw spindle 13, which is surrounded by a cylindrical housing shell 14. Located in an opening on the upper side of the housing shell 14 is a filling hopper 15, with which the granular solid material can be fed to the metering screw pump 11. The solid material advanced in this way passes via outlet openings 16 in the bottom of the reactor 311 into the interior of the reactor 311, which is filled with the low-melting alloy. Since the solid materials have a lower density than the metal alloy, they rise upward in the metal alloy. The solid materials are heated, whereby chemical or physical conversion processes can take place. If in the case of chemical conversion processes gases occur, they can be discharged through a gas outlet 17 in a top wall of the reactor 301. Below the top wall of the reactor there is a lateral outlet 18 for solid materials 19, which on the melt 3 can be removed from the reactor 311 via an outlet flap 20.

The solid materials 19 may be sand which in, a contaminated form passes through the inlet openings 16 into the melt 3 of the reactor 311. The organic constituents are mineralized by the influence of the high melting pool temperatures and transformed into gases, which are directed out of the reactor 311 through the gas outlet 17. The grains of sand collect on the surface of the melt as solid materials 19 and can be discharged from the reactor 311 in a cleaned form.

If the solid materials 19 are granules of plastic that are to be depolymerized, they can be transformed in a controlled manner by the exposure to heat by means of the low-melting alloy 3. For this, it is advantageous that screen arrangements 21 are provided one above the other in the reactor 311, on the one hand acting as obstacles 4 to allow the transit time of the solid materials 19 through the melt pool 3 to be extended, on the other hand, in particular in the case of transformation of plastic, bringing about an automatic control of the dwell time for specific conversion stages if they are formed with an increasingly smaller mesh width in the upward direction. A granular grain which enters the melt 3 through the inlet openings 16 and is of a size which is greater than the mesh width of the lower screen 21 remains below the lowermost screen 21 until the grain has been reduced in size by the conversion to the extent that it can pass through the first screen 21. The grain remains caught before the next screen 21 until it has once again been reduced in size sufficiently to pass through the mesh width of this screen. The other screens 21 act in the same way. With this use of the reactor 311, it is possible that solid materials in the form of granules of plastic or the like are directed through the inlet openings 16 and no solid materials 19 arrive at the surface of the melt pool 3 any longer, but instead there is, for example, a floating layer of liquid, which can then likewise be drawn off through the lateral outlet 18.

In the exemplary embodiment represented in FIG. 2, the reactor 311 is not heated up directly with a heating bar or a heating coil, but has thermally insulated cylindrical shell walls 22, which are arranged around windings of an electrical induction heater 23. The use of an induction heater 23 for the heating up of the melt 3 has the advantage over the use of a directly heating electrical heating element 1 in the bottom region of the reactor 301, 311 that defined temperature profiles can be set. According to the invention, it may be advantageous, for example, to set a temperature of 150° C. in a lower region of the reactor 311, so that, in a first stage, the fed raw materials are gently heated up in the melt pool 3. In a state lying thereover, a melt pool temperature of 200° C. may then be set by the induction heater 23. In an upper region, which extends over more than half the height of the reactor 311, a temperature of 400° C. is then set with the induction heater 23 in the exemplary embodiment represented. It is evident that such a temperature stratification cannot be realized with a heating element 1 arranged in the bottom and acting directly on the melt 3, since in this case the heat must be distributed by the effect of convection and the temperature is at a maximum at the electrical heating element 1.

With the induction heater 23, different temperature profiles can be set for different applications, allowing the desired chemical and/or physical conversions to be controlled in an optimized manner.

The invention claimed is:

1. A method for the depolymerisation of plastic material comprising the following steps:
    inductively heating low melting metals or metal alloys in a tank to form a metal melt pool, wherein a bottom temperature of the metal melt pool at a lower part of the tank is relatively lower than a top temperature of the metal melt pool at a higher part of the tank,
    metering plastic material directly into the metal melt pool in the lower part of the tank as solid materials, and
    heating the plastic material with the metal melt pool to produce the depolymerised plastic material, wherein the metal melt pool has a temperature between 50° C. and 550° C.

2. The method as claimed in claim 1, wherein the density of the plastic material is lower than the density of the metals or metal alloys.

3. The method as claimed in claim 1, wherein flow of the plastic material through the metal melt pool is slowed down by barrier walls, spiral conduits or gratings.

* * * * *